(12) United States Patent
Berding et al.

(10) Patent No.: US 6,888,698 B1
(45) Date of Patent: May 3, 2005

(54) DISK DRIVE INCLUDING SPINDLE MOTOR HUB AND DAMPING MEMBERS FOR DAMPING DISK MOVEMENT

(75) Inventors: Keith R. Berding, San Jose, CA (US); John R. Gustafson, Los Gatos, CA (US); Michael G. Choy, Mountain View, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/674,893

(22) Filed: Sep. 29, 2003

Related U.S. Application Data

(62) Division of application No. 09/945,040, filed on Aug. 31, 2001, now abandoned.

(51) Int. Cl.[7] .................................. G11B 17/022
(52) U.S. Cl. ........................................ 360/98.08
(58) Field of Search ..................... 360/98.08, 98.12

(56) References Cited

U.S. PATENT DOCUMENTS

| | | |
|---|---|---|
| 5,590,004 A | 12/1996 | Boutaghou |
| 5,781,374 A | 7/1998 | Moir et al. |
| 5,877,571 A | 3/1999 | Brooks |
| 6,040,957 A | 3/2000 | Konings |
| 6,064,547 A | 5/2000 | Wittig et al. |
| 6,172,844 B1 | 1/2001 | Luo et al. |
| 6,208,486 B1 | 3/2001 | Gustafson et al. |
| 6,212,030 B1 | 4/2001 | Koriyama et al. |
| 6,222,700 B1 | 4/2001 | Martin et al. |
| 6,255,750 B1 | 7/2001 | Mohajerani et al. |
| 6,282,054 B1 | 8/2001 | Luo |
| 6,339,273 B1 | 1/2002 | Higuchi |
| 6,414,817 B1 | 7/2002 | Luo et al. |
| 6,456,455 B2 | 9/2002 | McCutcheon et al. |

OTHER PUBLICATIONS

Sorbothane, Inc; Frequently Asked Questions, Oct. 26, 1999, Internet, Google.

*Primary Examiner*—Tianjie Chen
(74) *Attorney, Agent, or Firm*—Won Tae C. Kim, Esq.; Stetina, Brunda, Garred & Brucker

(57) ABSTRACT

A disk drive includes a disk drive base. The disk drive further includes a spindle motor hub rotatably coupled to the disk drive base. The disk drive further includes a disk disposed about the hub and having a disk surface. The disk drive further includes a disk clamp attached to the hub in mechanical communication with the disk surface for applying a clamping force to the disk. The disk drive further includes a disk clamp damping member disposed adjacent and in mechanical communication with the disk clamp and the disk surface for damping movement of the disk relative to the hub.

15 Claims, 5 Drawing Sheets

DISK DRIVE INCLUDING SPINDLE MOTOR HUB AND DAMPING MEMBERS FOR DAMPING DISK MOVEMENT

CROSS-REFERENCE TO RELATED APPLICATIONS

This patent application is divisional patent application of and claims priority to U.S. patent application Ser. No. 09/945,040 filed on Aug. 31, 2001 now abandoned, the contents of which are incorporated herein by reference.

BACKGROUND OF THE INVENTION

1. Field of the Invention

The present invention relates generally to disk drives, and more particularly to a disk drive having a damping member for damping disk movement with respect to a spindle motor hub.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA) having an actuator assembly having at least one transducer head, typically several, for reading and writing data to and from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically comprises an actuator body that rotates on a pivot assembly between limited positions, a coil portion that extends from one side of the actuator body to interact with one or more permanent magnets to form a voice coil motor, and one or more actuator arms that extend from an opposite side of the actuator body. A head gimbal assembly includes at least one transducer head, sometimes two, which is distally attached to each of the actuator arms. The actuator assembly includes the actuator body that has a bore and a pivot bearing cartridge engaged within the bore. The head gimbal assembly and the flex circuit cable assembly are attached to the actuator assembly.

The spindle motor includes a spindle motor hub that is rotatably attached to the disk drive base. The hub has an outer hub flange that supports a lowermost one of the disks. Additional disks may be stacked and separated with annular disk spacers that are disposed about the hub. A disk clamp is provided which is attached to an upper end of the hub in mechanical communication with an uppermost one of the disks for applying a clamping force to the disk towards the hub flange.

The spindle motor further includes an annular magnet element and a spindle motor stator. The magnet element is typically attached about the hub below the hub flange. The magnet element consists of a predetermined number of N and S poles that are disposed alternately circumferentially about the magnet element. The stator includes an outer stator rim that is attached to the disk drive base and a plurality of stator teeth. The stator is sized to fit about the hub and in particular the magnet element. Each stator tooth includes windings that selectively conduct current to create a magnetic field that interacts with the various poles of the magnet element. Such interaction results in forces applied to the hub which tend to rotate the hub.

A topic of concern is the desire to reduce vibrations or vertical movement of the disks during operation of the disk drive. Such movement may be a result of airflow generated within the disk drive due to rotation of the disks for example. In particular, such disk rotation induced airflow may result in various modes of vibration of the disks, i.e., disk flutter. This results in an increase in the percent off-track values of the associated heads attempting to read/write data to and from such vibrating disks. Accordingly, there is a need in the art for an improved disk drive for mitigation of the effects of vibration of the disks in comparison to the prior art.

SUMMARY OF THE INVENTION

An aspect of the invention can be regarded as a disk drive which includes a disk drive base. The disk drive further includes a spindle motor hub rotatably coupled to the disk drive base. The disk drive further includes a disk disposed about the hub and having a disk surface. The disk drive further includes a disk clamp attached to the hub in mechanical communication with the disk surface for applying a clamping force to the disk. The disk drive further includes a disk clamp damping member disposed adjacent and in mechanical communication with the disk clamp and the disk surface for damping movement of the disk relative to the hub.

According to an embodiment of the present invention, the disk clamp includes an inner annular surface disposed adjacent the hub. The disk clamp further includes an outer annular surface disposed concentrically about the inner annular surface. The disk clamp further includes a disk clamp land portion disposed between the inner and outer annular surfaces and extending from the inner and outer annular surfaces to adjacent the disk surface for applying a clamping force to the disk.

According to another embodiment of the present invention, the disk clamp includes an inner annular surface disposed adjacent the hub. The disk clamp damping member extends between the inner annular surface and the disk surface. The disk clamp further includes a disk clamp land portion disposed concentrically about the inner annular surface and extending from the inner annular surface to adjacent the disk surface for applying a clamping force to the disk.

According to another embodiment of the present invention, the disk clamp includes a disk clamp land portion disposed adjacent the hub and adjacent the disk surface for applying a clamping force to the disk. The disk clamp further includes an outer annular surface disposed concentrically about the disk clamp land portion. The disk clamp land portion extends from the outer annular surface to adjacent the disk surface. The disk clamp damping member extends between the outer annular surface and the disk surface.

According to an embodiment of the present invention, the disk clamp damping member is formed of a viscoelastic material.

According to another aspect of the present invention, there is provided a disk drive which includes a disk drive base. The disk drive further includes a spindle motor hub rotatably coupled to the disk drive base. The disk drive further includes a disk disposed about the hub and having a disk surface. The disk drive further includes an annular spacer disposed about the hub in mechanical communication with the disk surface. The disk drive further includes a disk spacer damping member disposed adjacent and in mechanical communication with the disk spacer and the disk surface for damping movement of the disk relative to the hub.

According to an embodiment of the present invention, the disk spacer includes a first inner annular surface disposed adjacent the hub. The disk spacer further includes a first outer annular surface disposed concentrically about the first inner annular surface. The disk spacer further includes a first spacer land portion disposed between the first inner annular surface and the first outer annular surface and extending from the first inner annular surface and the first outer annular surface to adjacent the: disk surface.

According to another embodiment of the present invention, the disk spacer includes a first inner annular surface disposed adjacent the hub. The disk spacer damping member extends between the first inner annular surface and the disk surface. The disk spacer further includes a first disk spacer land portion disposed concentrically about the first inner annular surface and extending from the first inner annular surface to adjacent the disk surface.

According to another embodiment of the present invention, the disk spacer includes a first disk spacer land portion disposed adjacent the hub and adjacent the disk surface. The disk spacer further includes a first outer annular surface disposed concentrically about the first disk spacer land portion. The first disk spacer land portion extends from the first outer annular surface to adjacent the disk surface. The disk spacer damping member extends between the first outer annular surface and the disk surface.

According to an embodiment of the present invention, the disk spacer damping member is formed of a viscoelastic material.

According to another aspect of the present invention, there is provided a disk drive which includes a disk drive base. The disk drive further includes a spindle motor hub rotatably coupled to the disk drive base. The disk drive further includes a disk disposed about the hub and having a disk surface. The disk drive further includes a hub flange radially extending from the hub, the hub flange being formed to support the disk at the disk surface. The disk drive further includes a hub flange damping member disposed adjacent and in mechanical communication with the hub flange and the disk surface for damping movement of the disk relative to the hub.

According to an embodiment of the present invention, the hub flange includes an inner annular surface disposed adjacent the hub. The hub flange further includes an outer annular surface disposed concentrically about the inner annular surface. The hub flange further includes a hub flange land portion disposed between the inner and outer annular surfaces and extending from the inner and outer annular surfaces to adjacent the disk surface for supporting the disk.

According to another embodiment of the present invention, the hub flange includes an inner annular surface disposed adjacent the hub. The hub flange damping member extends between the inner annular surface and the disk surface. The hub flange further includes a hub flange land portion disposed concentrically about the inner annular surface and extending from the inner annular surface to adjacent the disk surface for supporting the disk.

According to another embodiment of the present invention, the hub flange includes a hub flange land portion disposed adjacent the hub and adjacent the disk surface for supporting the disk. The hub flange further includes an outer annular surface disposed concentrically about the hub flange land portion. The hub flange land portion extends from the outer annular surface to adjacent the disk surface. The hub flange damping member extends between the outer annular surface and the disk surface.

According to an embodiment of the present invention, the disk clamp damping member is formed of a viscoelastic material.

According to another aspect of the present invention, there is provided a disk drive which includes a disk drive base. The disk drive further includes a spindle motor hub rotatably coupled to the disk drive base. The disk drive further includes a disk disposed about the hub and having two opposing disk surfaces. The disk drive further includes a disk clamp attached to the hub. The disk clamp has a disk clamp land formed to engage a disk surface of the disk in mechanical communication for applying a clamping force to the disk. The disk drive further includes a disk clamp damping member disposed adjacent and in mechanical communication with the disk clamp and a disk surface of the disk for damping movement of the disk relative to the hub. The disk drive further includes an annular disk spacer disposed about the hub. The disk spacer has a disk spacer land formed to engage a disk surface of the disk in mechanical communication for supporting the disk. The disk drive further includes a disk spacer damping member disposed adjacent in mechanical communication with the disk spacer and a disk surface of the disk for damping movement of the disk relative to the hub. The disk drive further includes a hub flange radially extending from the hub, the hub flange having a hub flange land portion formed to engage a disk surface of the disk. The disk drive further includes a hub flange damping member disposed adjacent and in mechanical communication with the hub flange and a disk surface of the disk for damping movement of the disk relative to the hub. In an embodiment of the present invention, the disk clamp land portion, the disk spacer land portion, and the hub flange land portion are aligned.

DESCRIPTION OF THE PREFERRED EMBODIMENTS

Figure 1:
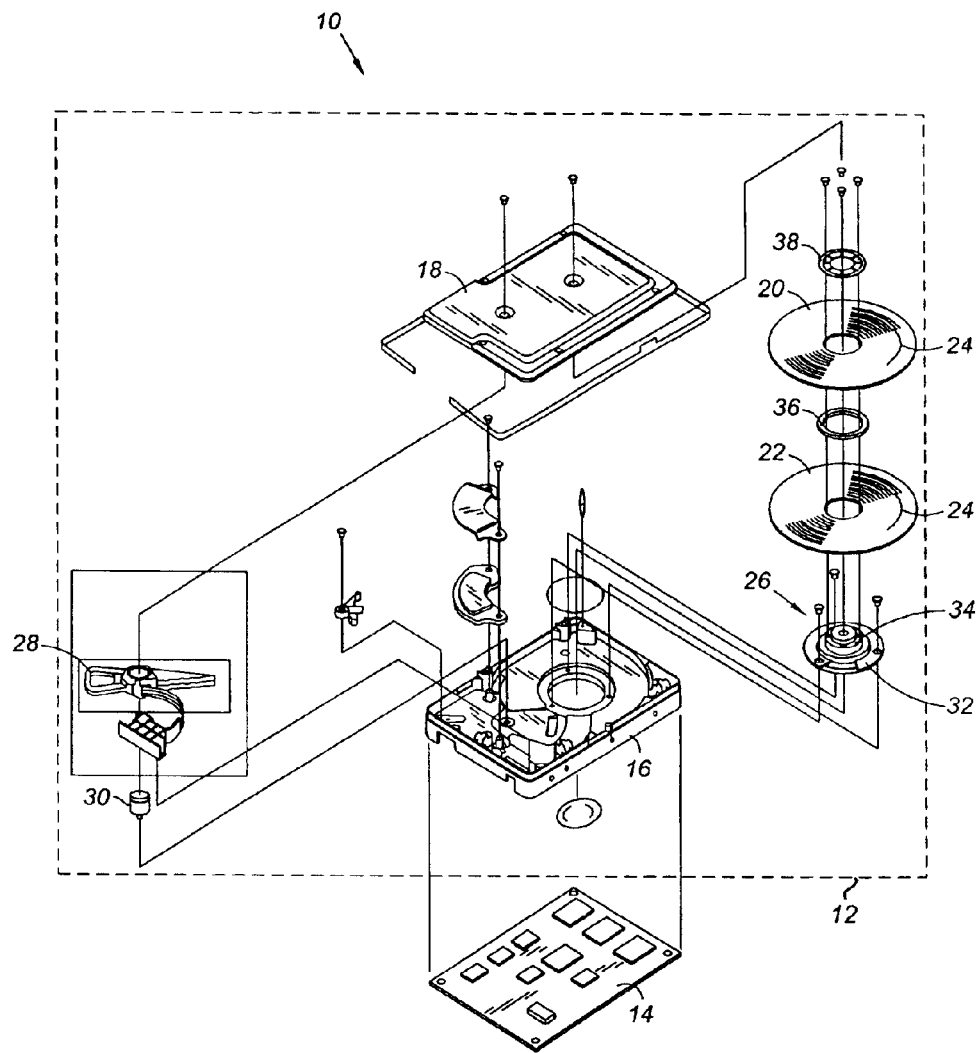
FIG. 1 is an exploded perspective view of a disk drive including a spindle motor as constructed in accordance with aspects of the present invention.

Referring now to the drawings wherein the showings are for purposes of illustrating preferred embodiments of the present invention only, and not for purposes of limiting the same, FIGS. 1–9 illustrate a disk drive 10 in accordance with the aspects of the present invention.

Referring now to FIG. 1 there is depicted an exploded perspective view of a disk drive 10 constructed in accordance with an aspect of the present invention. The disk drive 10 includes a head disk assembly (HDA) 12 and a printed circuit board assembly (PCBA) 14. The head disk 17 assembly 12 includes a disk drive base 16 and a cover 18 that collectively house magnetic disks 20, 22. Although two disks 20, 22 are shown, the present invention may be practiced with a single one of the disks 20 or 22 as well as this additional magnetic disks not shown. The disks 20, 22 each contain a plurality of tracks 24 for reading and writing data. The head disk assembly 12 further includes a spindle motor 26 for rotating the disks 20, 22. The spindle motor 26 is further depicted in detail in FIG. 2. The head disk assembly 12 further includes a head stack assembly 28. A pivot cartridge 30 is provided for pivoting the head stack assembly 28 relative to the rotating disks 20, 22 for reading and writing data to and from the disks 20, 22.

Figure 2:
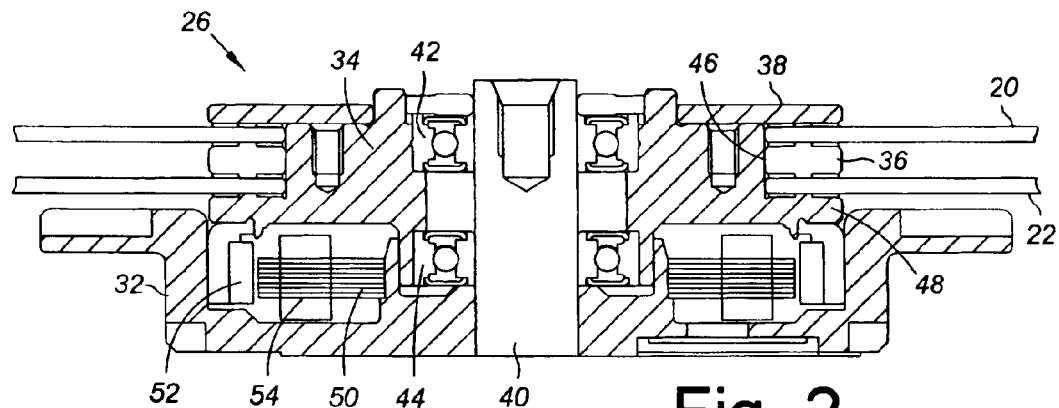
FIG. 2 is a cross-sectional view of a spindle motor of FIG. 1.
Figure 3:
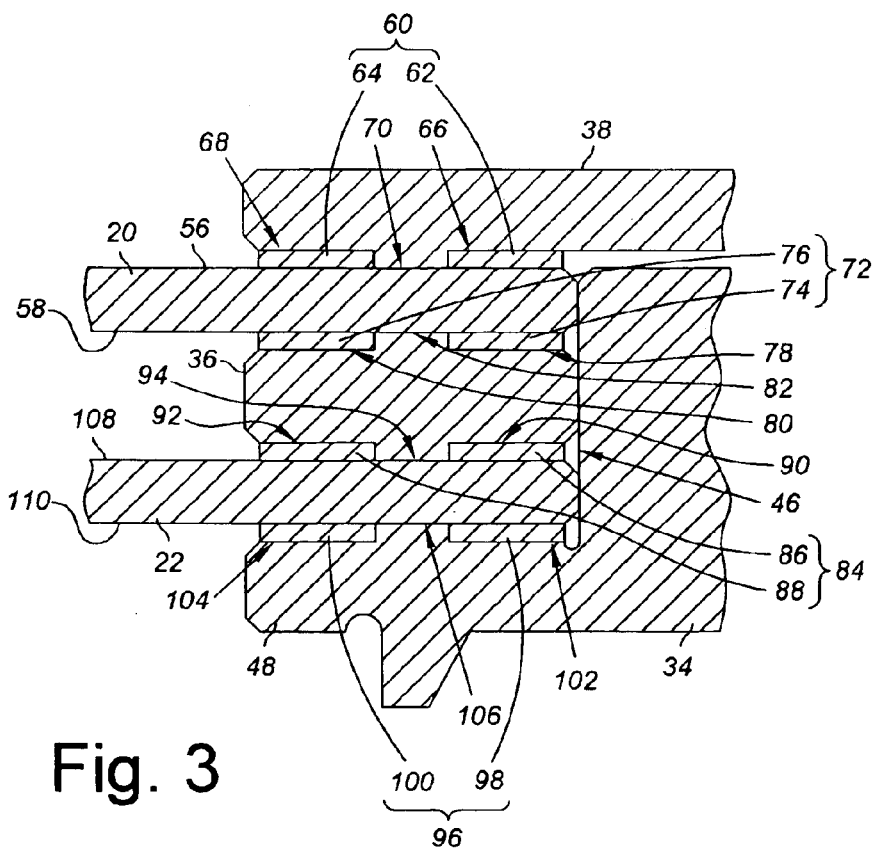
FIG. 3 is a partial cross-sectional view of the spindle motor of FIG. 2 shown with a disk clamp, a disk spacer and a spindle motor hub with a hub flange according to aspects of the present invention.

The spindle motor 26 includes a spindle motor base 32 that is attached to the disk drive base 16. The spindle motor 26 includes a spindle motor hub 34. A disk spacer 36 is provided which is configured to be disposed about the spindle motor hub 34. As shown, the disk spacer 36 is disposed between the disks 20, 22. In the case where additional magnetic disks are provided as mentioned above, additional disk spacers similar to disk spacer 36 may be utilized to separate such disks. A disk clamp 38 is further provided which is attached to the spindle motor hub 34 and is formed to engage the disk 20 for applying a clamping force to secure the disks 20, 22 in place with respect to the spindle motor hub 34. As will be discussed in detail below, additional embodiments of the spindle motor hub 34, the disk spacer 36, and the disk clamp 38 as shown in FIGS. 1–3 are depicted in FIGS. 4–9. It is understood that such components as described in relation to their general function in the context of the other above mentioned disk drive components are applicable to such additional embodiments.

Referring now to FIG. 2, there is depicted a cross-sectional view of the spindle motor 26. The spindle motor 26 includes the spindle motor base 32 which may be attached to the disk drive base 16 as shown in FIG. 1. It is contemplated that the disk drive base 16 and the spindle motor base 32 may be integrally formed structures. A shaft 40 is coupled to the spindle motor base 32 and the spindle motor hub. 34 surrounds the shaft 40. The spindle motor hub 34 may be rotatably coupled to the shaft 40 and therefore the spindle motor base 32 via a pair of bearing sets 42, 44. The spindle motor hub 34 may include a generally cylindrically-shaped hub wall 46. A hub flange 48 extends radially from the hub wall 46. While the hub flange 48 is shown to be integrally formed with the hub wall 46, the hub flange 48 may be a separately formed structure. A stator 50 is positioned about the shaft 40 and is attached to the spindle motor base 32. A magnet element 52 is attached to the hub flange 48. The stator 50 includes windings 54 that selectively conduct current to create a magnetic field that interacts with the various poles of the magnet element 52. Such interaction results in forces applied to the spindle motor hub 34 which tend to rotate the spindle motor hub 34. While the embodiment shown includes a fixed shaft/bearing set arrangement for effecting rotation of the spindle motor hub 34, other arrangements are contemplated, such as a rotating shaft motor arrangement.

Referring now to FIG. 3, there is depicted a partial cross-sectional view of the spindle motor 26 of FIG. 2. According to an aspect of the present invention, there is provided the disk drive 10 that includes the disk drive base 16. The disk drive 10 further includes a spindle motor hub 34 rotatably coupled to the disk drive base 16. The disk drive 10 further includes a disk 20 disposed about the spindle motor hub 34. The disk 20 includes a disk surface 56. The disk 20 may additionally include an opposing disk surface 58. The disk drive 10 further includes a disk clamp 38 which is attached to the spindle motor hub 34 in mechanical communication with the disk surface 56 for applying a clamping force to the disk 20. The disk drive 10 further includes a disk clamp damping member 60 disposed adjacent and in mechanical communication with the disk clamp 38 and the disk surface 56 for damping movement of the disk 10 relative to the spindle motor hub 34.

In the embodiment of the disk drive 10 shown in FIG. 1, the disk clamp 38 includes an inner annular surface 66 disposed adjacent the spindle motor hub 34. The disk clamp 38 further includes an outer annular surface 68 disposed concentrically about the inner annular surface 66. The disk clamp 38 further includes a disk clamp land portion 70 disposed between the inner and outer annular surfaces 66, 68 and extending from the inner and outer annular surfaces 66, 68 to adjacent the disk surface 56 for applying a clamping force to the disk 20. The disk clamp land portion 70 may be positioned upon the disk surface 56. While the disk clamp land portion 70 is shown to be a generally flat annular surface, other configurations are contemplated such as a configuration having a curved or rounded cross-section.

The disk clamp damping member 60 extends between the inner annular surface 66 of the disk clamp 38 and the disk surface 56 adjacent the disk clamp land portion 70. In this regard, the disk clamp damping member 60 may include an inner portion 62 which extends between the inner annular surface 66 of the disk clamp 38 and the disk surface 56 adjacent the disk clamp land portion 70. The disk clamp damping member 60 extends between the outer annular surface 68 of the disk clamp 38 and the disk surface 56 adjacent the disk clamp land portion 70. In this regard, the disk clamp damping member 60 may include an outer portion 64 which extends between the outer annular surface 68 of the disk clamp 38 and the disk surface 56 adjacent the disk clamp land portion 70.

It is contemplated that during operation of the disk drive 10, and in particular, during rotation of the spindle motor hub 34, the disk 20 may tend to vibrate or vertically move with respect to the spindle motor hub 34, such as a disk flutter motion. However, the intimate relationship of the disk clamp damping member 60 as being disposed between the disk surface 56 and the disk clamp 38 tends to reduce such disk movement. Such placement of the disk clamp damping member 60 tends to result in the disk clamp damping member 60 experiencing compression and/or shear loads during relative movement of the disk 20 or portions of the disk 20 with respect to portions of the disk clamp 38 adjacent the disk clamp damping member 60. The compression or shear loading of the disk clamp damping member 60 tends to reduce the kinetic energy of the disk 20 thereby causing a damping effect. Preferably, the disk clamp damping member 60, including the inner and outer portions 62, 64, is formed of a viscoelastic material, such as viscoelastics/pressure sensitive adhesives (3M ISD### products, Entrotech eca### products, and JDC MP## products). Other suitable materials for the disk clamp damping member 60 may include nitrile rubbers, butyl rubbers, polyurethanes, PVC based plastics, and nylons. In general, the disk clamp damping member 60 has damping characteristics greater than that of the adjacent disk clamp 38. To ensure that preloading of the damping member 60 remains in its designated location in mechanical communication with the disk surface 56, the damping member 60 may be preloaded in compression when installed.

According to another aspect of the present invention, there is provided the disk drive 10 that includes the disk drive base 16. The disk drive further includes the spindle motor hub 34 that is rotatably coupled to the disk drive base 16. The disk drive 10 further includes the disk 20 disposed about the spindle motor hub 34 and having the disk surface 58. The disk drive 10 further includes the annular disk spacer 36 disposed about the spindle motor hub 34 in mechanical communication with the disk surface 58. The disk drive 10 further includes a disk spacer damping member 72 disposed adjacent and in mechanical communication with the disk spacer 36 and the disk surface 58 for damping movement of the disk 20 relative to the hub 34.

Continuing with the embodiment shown in FIG. 3, the disk spacer 36 includes a first inner annular surface 78 that is disposed adjacent the spindle motor hub 34. The disk spacer 36 further includes a first outer annular surface 80 that is disposed concentrically about the first inner annular surface 78. The disk spacer 36 further includes a first spacer land portion 82 that is disposed between the first inner annular surface 78 and the first outer annular surface 80 and extending from the first inner annular surface 78 and the first outer annular surface 80 to adjacent the disk surface 58. The first disk spacer land portion 82 may be positioned upon the disk surface 58. The disk spacer damping member 72 extends between the first inner annular surface 78 of the disk spacer and the disk surface 58 adjacent the first spacer land portion 82. In this regard, the disk spacer damping member 72 may include an inner portion 74 that extends between the first inner annular surface 78 of the disk spacer and the disk surface 58 adjacent the first spacer land portion 82. The disk spacer damping member 72 may further extend between the first outer annular surface 80 of the disk spacer 36 and the disk surface 58 adjacent the first spacer land portion 82. In this regard, the disk spacer damping member 72 may include an outer portion 76 that extends between the first outer annular surface 80 of the disk spacer 36 and the disk surface 58 adjacent the first spacer land portion 82.

As mentioned above, a second disk 22 may be provided that is disposed about the spindle motor hub 34 and has disk surface 108. The disk spacer 36 may further include a second inner annular surface 90 disposed adjacent the spindle motor hub 34 opposing the first inner annular surface 78. The disk spacer 36 may further have a second outer annular surface 92 disposed concentrically about the second inner annular surface 90 and opposing the first outer annular surface 80. The disk spacer 36 may further have a second spacer land portion 94 disposed between the second inner annular surface 90 and the second outer annular surface 92 and extending opposite the first spacer land portion 82 from the second inner annular surface 90 and the second outer annular surface 92 to adjacent the disk surface 108 of the second disk 22. While the first and second spacer land portions 82,94 is shown to be a generally flat annular surfaces, other configurations are contemplated such as a configuration having a curved or rounded cross-section.

The disk spacer damping member 70 may additionally include a disk spacer damping member 94 that extends between the second inner annular surface 90 of the disk spacer 36 and the disk surface 108 of the second disk 22 adjacent the second spacer land portion 94. The disk spacer damping member 84 further extends between the second outer annular surface 92 of the disk spacer 36 and the disk surface 108 of the second disk 22 adjacent the second spacer land portion 94. In this regard, the disk spacer damping member 84, including inner and outer portions 86, 88, may interact with the disk surface 108 of disk 22 similar to how the disk spacer damping member 72 interacts with the disk surface 58 of disk 20. The disk spacer damping members 72, 84 are formed of a material that is similar to disk clamp damping member 60 as discussed above. It is contemplated that the outer portions 74, 88 may be integrally formed and extend peripherally about the disk spacer 36 for maintaining such inner and outer portions 74, 88 in the desired location.

According to another aspect of the present invention, there is provided the disk drive 10 that includes the disk drive base 16. The disk drive 10 further includes the spindle motor hub 34 that is rotatably coupled to the disk drive base 16. The disk drive 10 further includes the disk 22 disposed about the spindle motor hub 34 and having a disk surface 110. As shown the disk surface 110 is opposite the disk surface 108. The disk drive 10 further includes the hub flange 48 which is radially extends from the spindle motor hub 34. The hub flange 48 is formed to support the disk 22 at the disk surface 10. The disk drive 10 further includes a hub flange damping member 96 disposed adjacent and in mechanical communication with the hub flange 48 and the disk surface 110 for damping movement of the disk 22 relative to the spindle motor hub 34.

Continuing with the embodiment shown in FIG. 3, the hub flange 48 includes an inner annular surface 102 disposed adjacent the spindle motor hub 34. The hub flange 48 further includes an outer annular surface 104 disposed concentrically about the inner annular surface 102. The hub flange 48 further includes a hub flange land portion 106 disposed between the inner and outer annular surfaces 102, 104 and extending from the inner and outer annular surfaces 102, 104 to adjacent the disk surface 110 for supporting the disk 22. While the hub flange land portion 106 is shown to be a generally flat annular surface, other configurations are contemplated such as a configuration having a curved or rounded cross-section. The hub flange damping member 96 extends between the inner annular surface 102 of the hub flange 48 and the disk surface 110 adjacent the hub flange land portion 106. In this regard, the hub flange damping member 96 may include an inner portion 98 which extends from the inner annular surface 102 to adjacent the disk surface 110 for supporting the disk 22. The hub flange damping member 96 extends between the outer annular surface 104 of the hub flange 48 and the disk surface 110 adjacent the hub flange land portion 106. In this regard, the hub flange damping member 96 may include an outer portion 100 which extends from the outer annular surface 104 to adjacent the disk surface 110 for supporting the disk 22. The hub flange damping member 96, including the inner and outer portions 98, 100, is formed of a material that is similar to disk clamp damping member 60 as discussed above.

According to another aspect of the present invention, there is provided the disk drive 10 that includes the disk drive base 16. The disk drive 10 further includes the spindle motor hub 34 that is rotatably coupled to the disk drive base 16. The disk drive 10 further includes the disk 20 that is disposed about the spindle motor hub 34 and having the two opposing disk surfaces 56, 58. The disk drive 10 further includes the disk clamp 38 attached to the spindle motor hub 34. The disk clamp 38 has the disk clamp land 70 that is formed to engage the disk surface 56 of the disk 20 in mechanical communication for applying a clamping force to the disk 20. The disk drive 10 further includes the disk clamp damping member 60 disposed adjacent and in mechanical communication with the disk clamp 38 and the disk surface 56 of the disk 20 for damping movement of the disk 20 relative to the spindle motor hub 34. The disk drive 10 further includes the annular disk spacer 36 that is disposed about the spindle motor hub 34. The disk spacer 36 has the disk spacer land portion that is formed to engage a disk surface of a disk in mechanical communication for supporting the disk. In this regard, the disk spacer 36 may have the first disk spacer land portion 82 that is formed to engage the disk surface 58 of disk 20 in mechanical communication for supporting the disk 20. Alternatively or in addition to, the disk spacer 36 may have the second disk spacer land portion 94 that is formed to engage the disk surface 108 of disk 22 in mechanical communication for supporting the disk 22. The disk drive 10 further includes the disk spacer damping member (such as denoted 72 or 84 for example) that is disposed adjacent and in mechanical communication with the disk spacer 36 and the disk surface 58 or 108 of the disks 20, 22 for damping movement of the disks 20, 22 relative to the spindle motor hub 34. The disk drive 10 further includes the hub flange 48 that radially extends from the spindle motor hub 34. The hub flange 48 has the hub flange land portion 106 formed to engage the disk surface 10 of the disk 22. The disk drive 10 further includes the hub flange damping member 96 disposed adjacent and in mechanical communication with the hub flange 48 and the disk surface 10 of the disk 22 for damping movement of the disk 22 relative to the spindle motor hub 34.

In an embodiment of the present invention, the disk clamp land portion 70, the first disk spacer land portion 82 and/or the second disk spacer land portion 94, and the hub flange land portion 106 are aligned. In this regard, the clamping force applied by the disk clamp 38 is transferred in a generally straight path through the disk clamp land portion 70, the first disk spacer land portion 82 and/or the second disk spacer land portion 94, and the hub flange land portion 106.

Figure 4:
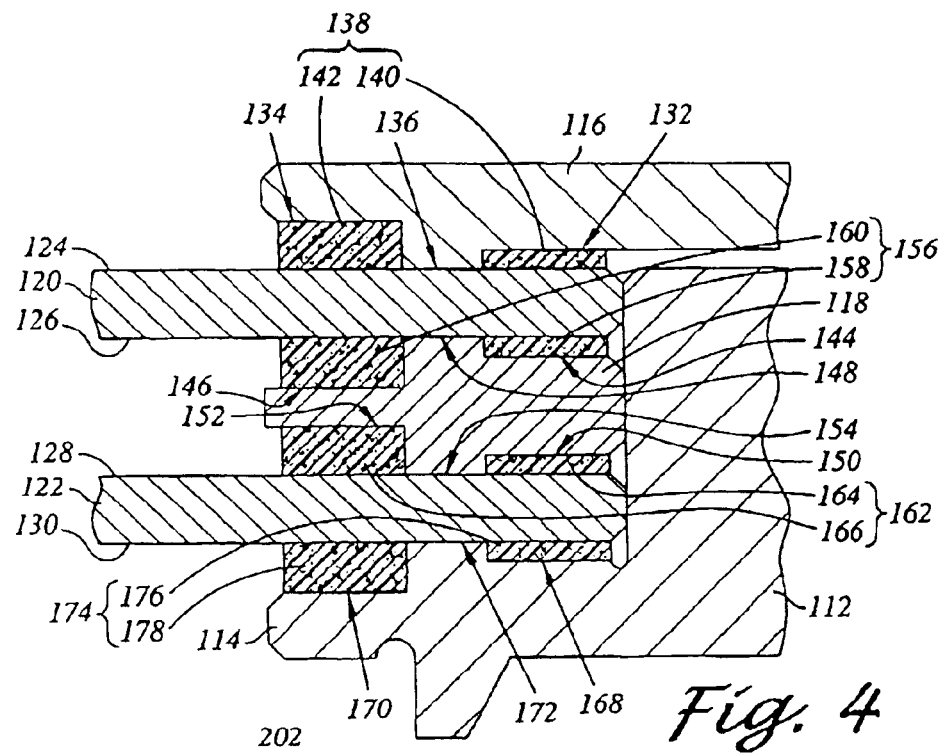
FIG. 4 is a partial cross-sectional view of a spindle motor shown with a disk clamp, a disk spacer and a spindle motor hub with a hub flange according to another embodiment of the present invention.

Referring now to FIG. 4, there is depicted another embodiment according to aspects of the present invention. In comparison to the embodiment described above of disk drive 10 as shown in FIG. 3, discussed below are differences with the present embodiment as shown in FIG. 4. In this present embodiment, there is provided a spindle motor hub 112 having a hub flange 114, a disk clamp 116, a disk spacer 118, and disks 120, 122 respectively having disk surfaces 124, 126, 128, 130.

The disk clamp 116 includes an inner annular surface 132 disposed adjacent the spindle motor hub 112. The disk clamp 116 further includes an outer annular surface 134 disposed concentrically about the inner annular surface 132. The disk clamp 116 further includes a disk clamp land portion 136 disposed between the inner and outer annular surfaces 132, 134 and extending from the inner and outer annular surfaces 132, 134 to adjacent the disk surface 124 for applying a clamping force to the disk 120. In this embodiment the inner and outer annular surfaces 132, 134 are off-set differently from the disk clamp land portion 136. A disk clamp damping member 130 is further provided with inner and outer portions 140, 142 generally similar to the disk clamp damping member 60 and inner and outer portions 62, 64. However, the relative sizing of the inner and outer portions 140, 142 are different with respect to each other as the spacing between the inner annular surface 132 to the disk surface 124 and the spacing between the outer annular surface 134 to the disk surface 124 are different. In this regard, it is contemplated that the relative damping characteristics and stiffness desired with respect to different radial locations of the disk 120 may be selectively controlled by the off-set nature of the inner and outer annular surfaces 132, 134. Further, it is contemplated that the various radial sizing and radial location with respect to the spindle motor hub 112 of the inner and outer annular surfaces 132, 134 and inner and outer portions 140, 142 may be selectively chosen to result in desired damping characteristics and stiffness associated with the same.

The disk spacer 118 includes a first inner annular surface 144 disposed adjacent the spindle motor hub 112. The disk spacer 118 further includes a first outer annular surface 146 disposed concentrically about the first inner annular surface 144. The disk spacer 118 further includes a first disk spacer land portion 148 disposed between the first inner and outer annular surfaces 144, 146 and extending from the first inner and outer annular surfaces 144, 146 to adjacent the disk surface 126. In this embodiment the first inner and outer annular surfaces 144, 146 are off-set differently from the first disk spacer land portion 148. Further, the disk spacer 118 may include a second inner annular surface 150, a second outer annular surface 152, and a second disk spacer land portion 154 respectively disposed opposite the first inner annular surface 144, the first outer annular surface 146, and the first disk spacer land portion 148. As such, the second inner and outer annular surfaces 150, 152 may be off-set differently from the second disk spacer land portion 154.

A first disk spacer damping member 156 is further provided having inner and outer portions 158, 160 generally similar to the first disk spacer member 72 and inner and outer portions 74, 76. However, the relative sizing of the inner and outer portions 158, 160 are different with respect to each other as the spacing between the first inner annular surface 144 to the disk surface 126 and the spacing between the outer annular surface 146 to the disk surface 126 are different. In this regard, it is contemplated that the relative damping characteristics desired with respect to different radial locations of the disk 120 may be selectively controlled by the off-set nature of the first inner and outer annular surfaces 158, 160. Similarly, a second disk spacer damping member 162 having inner and outer portions 1641, 166 may be provided adjacent the disk surface 128 of disk 122. Further, it is contemplated that the various radial sizing and radial location with respect to the spindle motor hub 112 of the first inner and outer annular surfaces 144, 146, the second inner and outer annular surfaces 150, 152, the inner and outer portions 158, 160 and inner and outer portions 164, 166 may be selectively chosen to result in desired damping characteristics and stiffness associated with the same.

The hub flange 114 includes an inner annular surface 168 disposed adjacent the spindle motor hub 112. The hub flange 114 further includes an outer annular surface 170 disposed concentrically about the inner annular surface 168. The hub flange 114 further includes a hub flange land portion 172 disposed between the inner and outer annular surfaces 168, 170 and extending from the inner and outer annular surfaces 168, 170 to adjacent the disk surface 130. A hub flange damping member 174 is further provided having inner and outer portions 176, 178 generally similar to the hub flange damping member 96 and inner and outer portions 98, 100. However, the relative sizing of the inner and outer portions 176, 178 are different with respect to each other as the spacing between the inner annular surface 168 to the disk surface 130 and the spacing between the outer annular surface 170 to the disk surface 130 are different. In this regard, it is contemplated that the relative damping characteristics desired with respect to different radial locations of the disk 122 may be selectively controlled by the off-set nature of the inner and outer annular surfaces 168, 170. Further, it is contemplated that the various radial sizing and radial location with respect to the spindle motor hub 112 of the inner and outer annular surfaces 168, 170 and inner and outer portions 176, 178 may be selectively chosen to result in desired damping characteristics and stiffness associated with the same.

Figure 5:
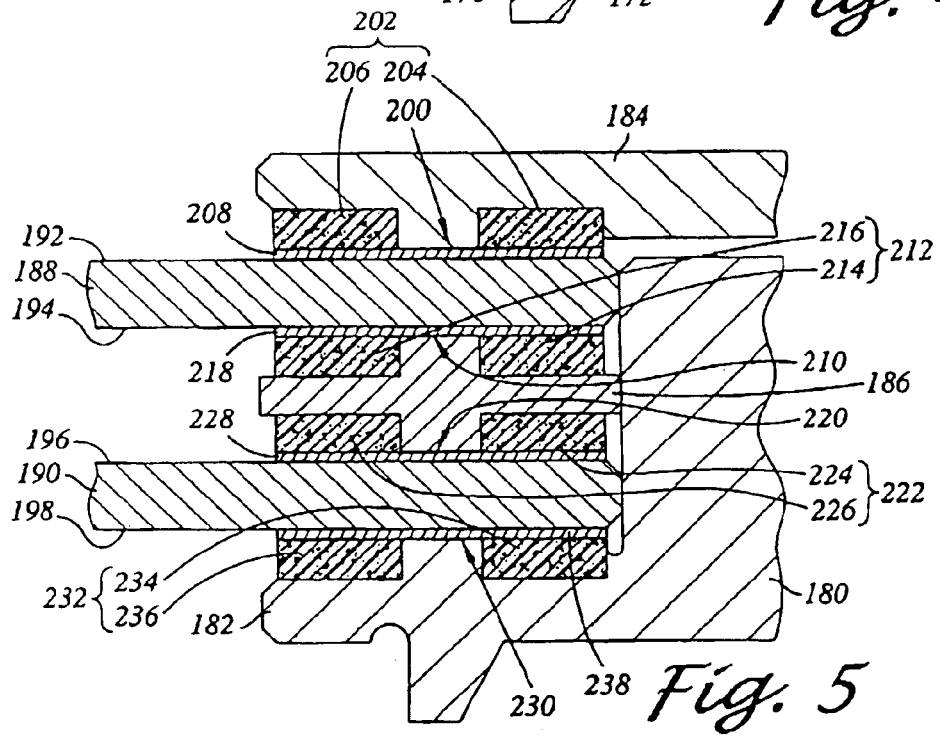
FIG. 5 is a partial cross-sectional view of a spindle motor shown with a disk clamp, a disk spacer and a spindle motor hub with a hub flange according to another embodiment of the present invention.

Referring now to FIG. 5, there is depicted another embodiment according to aspects of the present invention. In comparison to the embodiment described above of disk drive 10 as shown in FIG. 3, discussed below are differences with the present embodiment as shown in FIG. 5. In this present embodiment, there is provided a spindle motor hub 180 having a hub flange 182, a disk clamp 184, a disk spacer 186, and disks 188, 190 respectively having disk surfaces 192, 194, 196, 198.

The disk clamp 184 is provided with a disk clamp land portion 200. Further, there is provided a disk clamp damping member 202 having inner and outer portions 204, 206. In this embodiment, the disk clamp 184 is additionally provided with an annular disk clamp shim 208 which is disposed between the disk clamp damping member 184 and the disk surface 192. Further, the disk clamp shim 208 may be disposed between the disk clamp land portion 200 and the disk surface 192. In this regard, the disk clamp damping member 202 and the disk clamp land portion 200 need not directly contact the disk surface 192, but rather an intermediate structure or structures may be interposed between the disk clamp damping member 202 and disk clamp land portion 200 and the disk surface 192 for effectuating mechanical communication therebetween. The disk clamp shim 208 may be formed of relatively thin flexible material such as a thin aluminum or stainless steel washer, or a plastic film. However, the disk clamp shim 208 need not be a separately formed element, but may take the form of a coating disposed upon the disk clamp damping member 202 and disk clamp land portion 200. It is contemplated that the disk clamp damping member 202 may have a tacky or sticky consistency. Utilization of the disk clamp shim 208 has the advantage of mitigating problems associated with the disk clamp damping member 202 being directly disposed upon the disk surface 192 and adhering to the disk surface 192.

The disk spacer 186 is provided with a first disk spacer land portion 210. Further, there is provided a first disk spacer damping member 212 having inner and outer portions 214, 216. In this embodiment, the disk spacer 186 is additionally provided with an annular first disk spacer shim 218 which is disposed between the first disk spacer damping member 212 and the disk surface 194. Further, the first disk spacer shim 218 may be disposed between the first disk spacer land portion 210 and the disk surface 194. Similarly, the disk spacer 186 may be provided with a second disk spacer land portion 220. Further, there is provided a second disk spacer damping member 222 having inner and outer portions 224, 226. In this embodiment, the disk spacer 186 is additionally provided with an annular second disk spacer shim 228 which is disposed between the second disk spacer damping member 222 and the disk surface 196. Further, the second disk spacer shim 228 may be disposed between the second disk spacer land portion 220 and the disk surface 196.

The hub flange 182 is provided with a hub flange land portion 230. Further, there is provided a hub flange damping member 232 having inner and outer portions 234, 236. In this embodiment, the hub flange 182 is additionally provided with an annular hub flange shim 238 which is disposed between the hub flange damping member 182 and the disk surface 198. Further, the hub flange shim 238 may be disposed between the hub flange land portion 230 and the disk surface 198.

Figure 6:
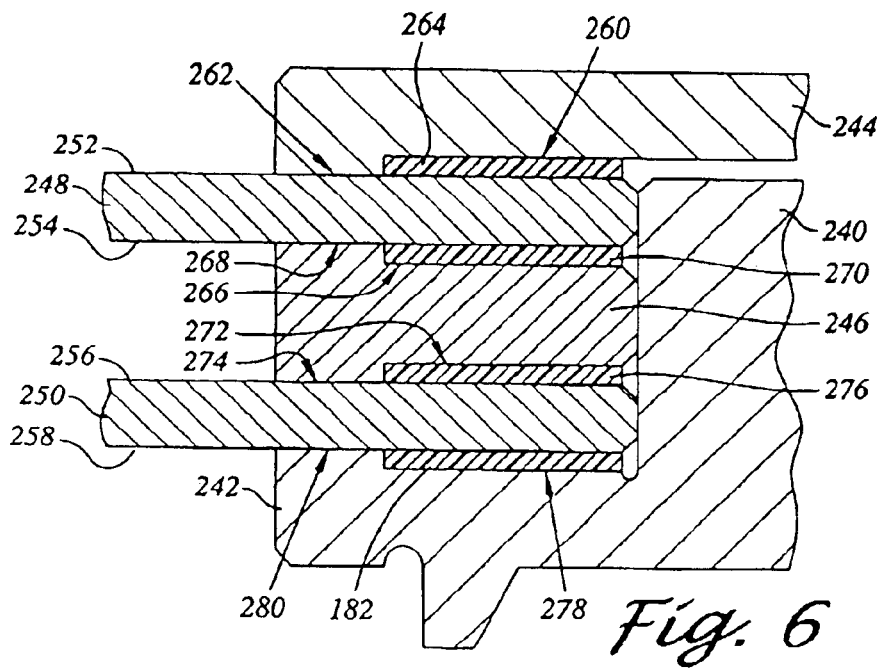
FIG. 6 is a partial cross-sectional view of a spindle motor shown with a disk clamp, a disk spacer and a spindle motor hub with a hub flange according to another embodiment of the present invention.

Referring now to FIG. 6, there is depicted another embodiment according to aspects of the present invention. In comparison to the embodiment described above of disk drive 10 as shown in FIG. 3, discussed below are differences with the present embodiment as shown in FIG. 6. In this present embodiment, there is provided a spindle motor hub 240 having a hub flange 242, a disk clamp 244, a disk spacer 246, and disks 248, 250 respectively having disk surfaces 252, 254, 256, 258.

The disk clamp 244 is provided with an inner annular surface 260 and a disk clamp land portion 262 concentrically disposed about the inner annular surface 260 extending from the inner annular surface 260 to adjacent the disk surface 252 for applying a clamping force to the disk 248. A disk clamp damping member 264 is disposed between the inner annular surface 260 and the disk surface 252 adjacent to the disk surface 252.

The disk spacer 246 is provided with a first inner annular surface 266 and a first disk spacer land portion 268 concentrically disposed about the first inner annular surface 266 extending from the first inner annular surface 266 to adjacent the disk surface 254. A first disk spacer damping member 270 is disposed between the first inner annular surface 266 and the disk surface 254 adjacent to the disk surface 254. The disk spacer 246 is provided with a second inner annular surface 272 and a second disk spacer land portion 274 concentrically disposed about the second inner annular surface 272 extending from the second inner annular surface 272 to adjacent the disk surface 256. A second disk spacer damping member 276 is disposed between the second inner annular surface 272 and the disk surface 256 adjacent to the disk surface 256.

The hub flange 242 is provided with an inner annular surface 278 and a hub flange land portion 280 concentrically disposed about the inner annular surface 278 extending from the inner annular surface 278 to adjacent the disk surface 258. A hub flange damping member 282 is disposed between the inner annular surface 278 and the disk surface 258 adjacent to the disk surface 258.

Figure 7:
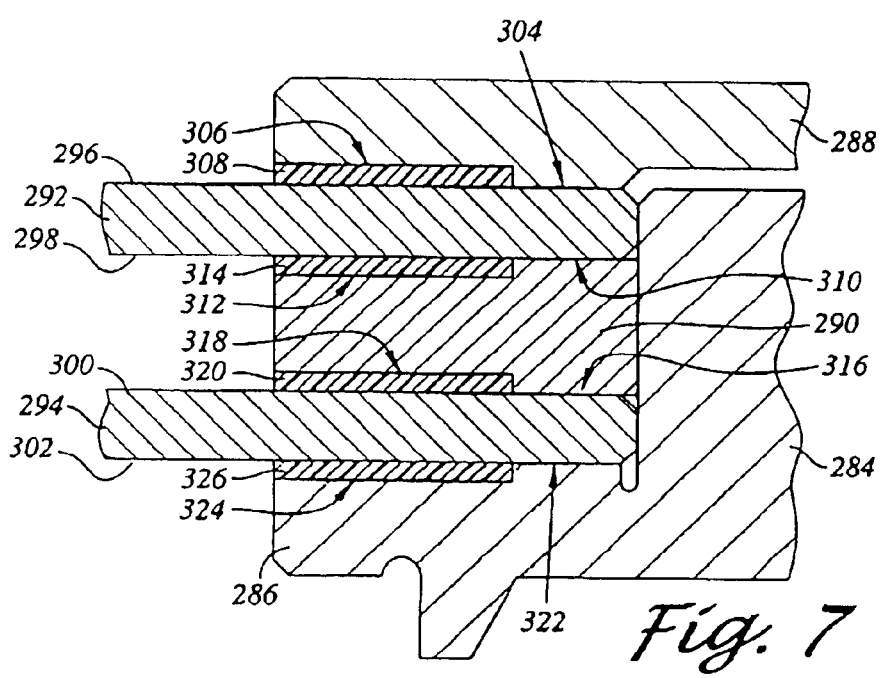
FIG. 7 is a partial cross-sectional view of a spindle motor shown with a disk clamp, a disk spacer and a spindle motor hub with a hub flange according to another embodiment of the present invention.

Referring now to FIG. 7, there is depicted another embodiment according to aspects of the present invention. In comparison to the embodiment described above of disk drive 10 as shown in FIG. 3, discussed below are differences with the present embodiment as shown in FIG. 7. In this present embodiment, there is provided a spindle motor hub 284 having a hub flange 286, a disk clamp 288, a disk spacer 290, and disks 292, 294 respectively having disk surfaces 296, 298, 300, 302.

The disk clamp 288 is provided with an outer annular surface 304 and a disk clamp land portion 306 concentrically disposed within the outer annular surface 304 extending from the outer annular surface 304 to adjacent the disk surface 296 for applying a clamping force to the disk 292. A disk clamp damping member 308 is disposed between the outer annular surface 304 and the disk surface 296 adjacent to the disk surface 296.

The disk spacer 290 is provided with a first outer annular surface 310 and a first disk spacer land portion 312 concentrically disposed within the first outer annular surface 310 extending from the first outer annular surface 310 to adjacent the disk surface 298. A first disk spacer damping member 314 is disposed between the first outer annular surface 310 and the disk surface 298 adjacent to the disk surface 298. The disk spacer 290 is provided with a second outer annular surface 316 and a second disk spacer land portion 318 concentrically disposed within the second outer annular surface 316 extending from the second outer annular surface 316 to adjacent the disk surface 300. A second disk spacer damping member 320 is disposed between the second outer annular surface 316 and the disk surface 300 adjacent to the disk surface 300.

The hub flange, 286 is provided with an outer annular surface 322 and a hub flange land portion 324 concentrically disposed within the outer annular surface 322 extending from the outer annular surface 322 to adjacent the disk surface 302. A hub flange damping member 326 is disposed between the outer annular surface 322 and the disk surface 302 adjacent to the disk surface 302.

Figure 8:
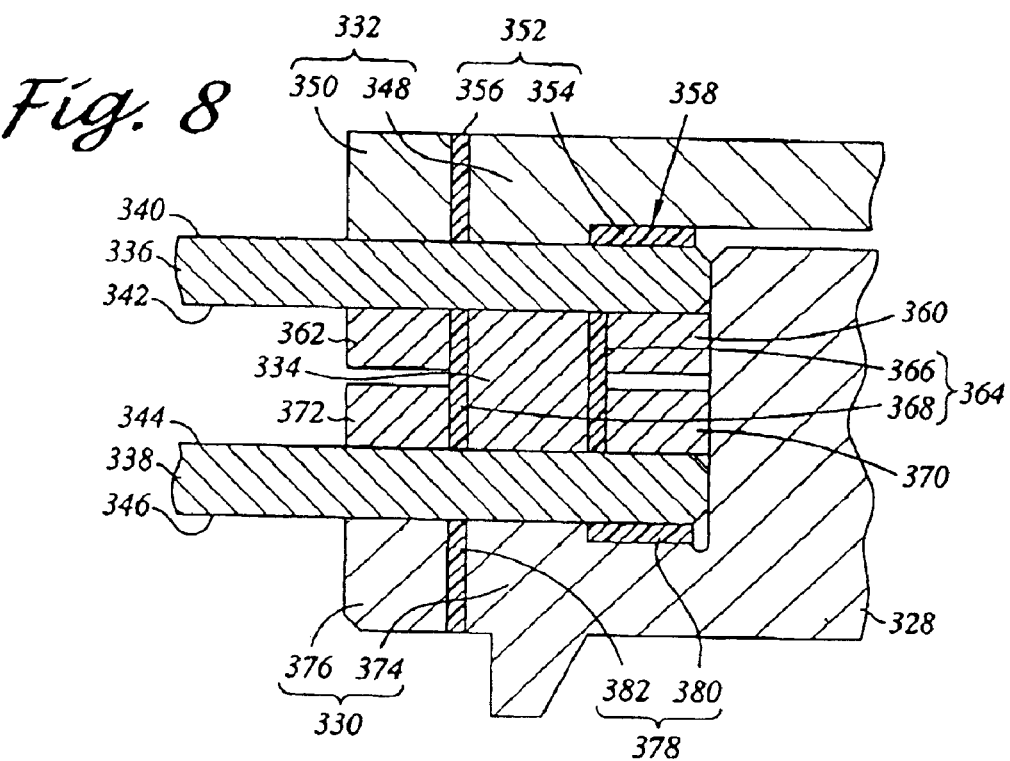
FIG. 8 is a partial cross-sectional view of a spindle motor shown with a disk clamp, a disk spacer and a spindle motor hub with a hub flange according to another embodiment of the present invention.

Referring now to FIG. 8, there is depicted another embodiment according to aspects of the present invention. In comparison to the embodiment described above of disk drive 10 as shown in FIG. 3, discussed below are differences with the present embodiment as shown in FIG. 8. In this present embodiment, there is provided a spindle motor hub 328 having a hub flange 330, a disk clamp 332, a disk spacer 334, and disks 336, 338 respectively having disk surfaces 340, 342, 344, 346.

The disk clamp 332 includes an inner clamp member 348 and an outer clamp member 350 disposed concentrically about the inner clamp member 348. A disk clamp damping member 352 is provided that includes a first section 354 and a second section 356. The first section 354 extends between an inner annular surface 358 of the disk clamp 332 and the disk surface 340. The second section 356 extends between the inner clamp member 348 and the outer clamp member 350.

The disk spacer 334 may include a first inner member 360 and a first outer member 362. The first inner member 360 is disposed concentrically within the disk spacer 334 and adjacent the disk surface 342. The first outer member 362 is disposed concentrically about the disk spacer 334 and adjacent the disk surface 342. A disk spacer damping member 364 is provided that includes a first section 366 and a second section 368. The first section 366 is disposed between the disk spacer 334 and the first inner member 360. The second section 368 is disposed between the disk spacer 334 and the first outer member 362. The disk spacer 334 may include a second inner member 370 and a second outer member 372. The second inner member 370 is disposed concentrically within the disk spacer 334 and adjacent the disk surface 344. The second outer member 372 is disposed concentrically about the disk spacer 334 and adjacent the disk surface 344. The first section 366 is disposed between the disk spacer 334 and the second inner member 370. The second section 368 is disposed between the disk spacer 334 and the second outer member 372.

The hub flange 330 includes an inner hub flange member 374 and an outer hub flange member 376 disposed concentrically about the inner hub flange member 374. A hub flange damping member 378 is provided that includes a first section 380 and a second section 382. The first section 380 extends between an inner annular surface 384 of the hub flange 330 and the disk surface 346. The second section 382 extends between the inner hub flange member 374 and the outer hub flange member 376.

Figure 9:
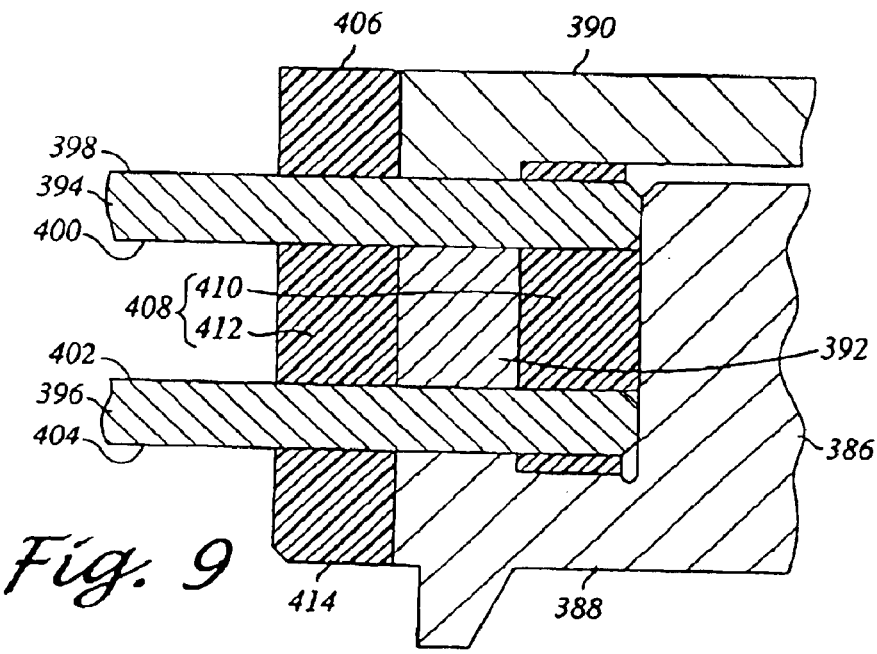
FIG. 9 is a partial cross-sectional view of a spindle motor shown with a disk clamp, a disk spacer and a spindle motor hub with a hub flange according to another embodiment of the present invention.

Referring now to FIG. 9, there is depicted another embodiment according to aspects of the present invention. In comparison to the embodiment described above of disk drive 10 as shown in FIG. 3, discussed below are differences with the present embodiment as shown in FIG. 9. In this present embodiment, there is provided a spindle motor hub 386 having a hub flange 388, a disk clamp 390, a disk spacer 392, and disks 394, 396 respectively having disk surfaces 398, 400, 402, 404. In this embodiment, there is provided a disk clamp damping member 406 that is disposed concentrically about the disk clamp 390 adjacent the disk surface 398. Further, a disk spacer damping member 408 may be provided that has an inner section 410 and an outer section 412. The inner section 410 is disposed concentrically within the disk spacer 392. As shown, the inner section 410 extends between and adjacent to both the disk surface 400 and the disk surface 402. The outer section 412 is disposed concentrically about the disk spacer 392. The outer section 412 extends between and adjacent to both the disk surface 400 and the disk surface 402. Further, a hub flange damping member 414 may be disposed concentrically about the hub flange 388 adjacent the disk surface 404.

We claim:

1. A disk drive comprising:
   a disk drive base;
   a spindle motor hub rotatably coupled to the disk drive base;
   a disk disposed about the hub and having a disk surface;
   a disk clamp attached to the hub in mechanical communication with the disk surface for applying a clamping force to the disk, the disk clamp including:
   an inner annular surface disposed adjacent the hub;
   an outer annular surface disposed concentrically about the inner annular surface; and
   a disk damp land portion disposed between the inner and outer annular surfaces and extending from the inner and outer annular surfaces to adjacent the disk surface for applying a clamping force to the disk;
   a disk clamp damping member disposed adjacent and in mechanical communication with the disk clamp and the disk surface for damping movement of the disk relative to the hub; and
   an annular disk clamp shim disposed between the disk clamp damping member and the disk surface and between the disk clamp land portion and the disk surface.

2. The disk drive of claim 1 wherein the disk clamp damping member extends between the outer annular surface of the disk clamp and the disk surface adjacent the disk clamp land portion.

3. The disk drive of claim 1 wherein an inner portion of the disk clamp damping member extends between the inner annular surface of the disk clamp and a first portion of the disk surface adjacent the disk clamp land portion.

4. The disk drive of claim 3 wherein an outer portion of the disk clamp damping member extends between the outer annular surface of the disk clamp and a second portion of the disk surface adjacent the disk clamp land portion.

5. The disk drive of claim 1 wherein the disk clamp damping member is formed of a viscoelastic material.

6. A disk drive comprising:
   a disk drive base;
   a spindle motor hub rotatably coupled to the disk drive base;
   a disk disposed about the hub and having a disk surface;
   an annular disk spacer disposed about the hub in mechanical communication with the disk surface, the disk spacer including:
      a first inner annular surface disposed adjacent the hub;
      a first outer annular surface disposed concentrically about the first inner annular surface; and
      a first spacer land portion disposed between the first inner annular surface and the first outer annular surface and extending from the first inner annular surface and the first outer annular surface to adjacent the disk surface;
   a disk spacer damping member disposed adjacent and in mechanical communication with the disk spacer and the disk surface for damping movement of the disk relative to the hub; and
   a first annular disk spacer shim is disposed between the disk spacer damping member and the disk surface and between the disk spacer land portion and the disk surface.

7. The disk drive of claim 6 wherein the disk spacer damping member extends between the first outer annular surface of the disk spacer and the disk surface adjacent the first spacer land portion.

8. The disk drive of claim 6 wherein an inner portion of the disk spacer damping member extends between the first inner annular surface of the disk spacer and a first portion of the disk surface adjacent the first spacer land portion.

9. The disk drive of claim 8 wherein an outer portion of the disk spacer damping member extends between the first outer annular surface of the disk spacer and a second portion of the disk surface adjacent the first spacer land portion.

10. The disk drive of claim 6 wherein the disk spacer damping member is formed of a viscoelastic material.

11. A disk drive comprising:
    a disk drive base;
    a spindle motor hub rotatably coupled to the disk drive base;
    a disk disposed about the hub and having a disk surface;
    a hub flange radially extending from the hub, the hub flange being formed to support the disk at the disk surface, the hub flange includes:
       an inner annular surface disposed adjacent the hub;
       an outer annular surface disposed concentrically about the inner annular surface; and
       a hub flange land portion disposed between the inner and outer annular surfaces and extending from the inner and outer annular surfaces to adjacent the disk surface for supporting the disk;
    a hub flange damping member disposed adjacent and in mechanical communication with the hub flange and the disk surface for damping movement of the disk relative to the hub; and
    a first annular hub flange shim is disposed between the hub flange damping member and the disk surface and between the hub flange land portion and the disk surface.

12. The disk drive of claim 11 wherein the hub flange damping member extends between the outer annular surface of the hub flange and the disk surface adjacent the hub flange land portion.

13. The disk drive of claim 11 wherein an inner portion of the hub flange damping member extends between the inner annular surface of the hub flange and a first portion of the disk surface adjacent the hub flange land portion.

14. The disk drive of claim 13 wherein an outer portion of the hub flange damping member extends between the outer annular surface of the hub flange and a second portion of the disk surface adjacent the hub flange land portion.

15. The disk drive of claim 11 wherein the disk clamp damping member is formed of a viscoelastic material.

* * * * *